(12) United States Patent
Werner et al.

(10) Patent No.: US 9,323,807 B2
(45) Date of Patent: Apr. 26, 2016

(54) GRAPHICAL MANIPULATION OF DATA OBJECTS

(75) Inventors: Horst Werner, Muehlhausen-Rettigheim (DE); Joerg Beringer, Los Altos, CA (US)

(73) Assignee: SAP SE, Walldorf (DE)

( * ) Notice: Subject to any disclaimer, the term of this patent is extended or adjusted under 35 U.S.C. 154(b) by 421 days.

(21) Appl. No.: 12/939,145

(22) Filed: Nov. 3, 2010

(65) Prior Publication Data

US 2012/0110519 A1    May 3, 2012

(51) Int. Cl.
*G06F 3/00* (2006.01)
*G06F 17/30* (2006.01)
*G06F 3/01* (2006.01)

(52) U.S. Cl.
CPC ............................ *G06F 17/30398* (2013.01)

(58) Field of Classification Search
USPC ......... 715/810, 764, 863, 859, 860, 822, 823; 382/186, 187, 188, 189; 345/173
See application file for complete search history.

(56) References Cited

U.S. PATENT DOCUMENTS

| | | | | |
|---|---|---|---|---|
| 5,471,578 | A * | 11/1995 | Moran et al. | 715/863 |
| 5,513,309 | A * | 4/1996 | Meier et al. | 715/860 |
| 5,694,532 | A * | 12/1997 | Carey et al. | 345/419 |
| 5,787,061 | A * | 7/1998 | Tsuchiya et al. | 369/44.29 |
| 5,809,297 | A * | 9/1998 | Kroenke et al. | |
| 5,861,886 | A * | 1/1999 | Moran et al. | 715/863 |
| 6,243,724 | B1 * | 6/2001 | Mander et al. | 715/273 |
| 6,317,739 | B1 | 11/2001 | Hirata et al. | |
| 6,351,559 | B1 * | 2/2002 | Zhou et al. | 382/175 |
| 6,728,728 | B2 * | 4/2004 | Spiegler et al. | 707/603 |
| 7,000,197 | B1 | 2/2006 | Bou et al. | |
| 7,137,077 | B2 * | 11/2006 | Iwema et al. | 715/863 |
| 7,218,330 | B1 * | 5/2007 | Winkenbach et al. | 345/620 |
| 7,643,012 | B2 * | 1/2010 | Kim et al. | 345/173 |
| 7,737,995 | B2 * | 6/2010 | Vronay et al. | 345/619 |
| 8,402,382 | B2 * | 3/2013 | Agarawala et al. | 715/765 |
| 2003/0009411 | A1 * | 1/2003 | Ram et al. | 705/37 |
| 2003/0179214 | A1 * | 9/2003 | Saund et al. | 345/619 |
| 2003/0179235 | A1 * | 9/2003 | Saund et al. | 345/764 |
| 2003/0214536 | A1 * | 11/2003 | Jarrett et al. | 345/831 |
| 2003/0217336 | A1 * | 11/2003 | Gounares et al. | 715/541 |
| 2004/0119763 | A1 * | 6/2004 | Mizobuchi et al. | 345/863 |
| 2004/0181513 | A1 * | 9/2004 | Henderson et al. | 707/3 |
| 2005/0154991 | A1 * | 7/2005 | Jaeger | 715/769 |

(Continued)

FOREIGN PATENT DOCUMENTS

WO    WO-2007096697 A1    8/2007

OTHER PUBLICATIONS

"European Application Serial No. 11008558.6, European Search Report mailed Mar. 14, 2012", 6 pgs.

(Continued)

*Primary Examiner* — Toan Vu
(74) *Attorney, Agent, or Firm* — Schwegman Lundberg & Woessner, P.A.

(57) ABSTRACT

In an embodiment, a user input defining an enclosed, graphical shape on a video display is received. A number of graphical items are identified as being included within the enclosed, graphical shape. Here, each graphical item is displayed on the video display and represents a data object that has a number of properties. A property is extracted from the number of properties that the data objects have in common based on the identification. A number of other manipulation techniques are also described.

20 Claims, 13 Drawing Sheets

(56) References Cited

U.S. PATENT DOCUMENTS

| | | | |
|---|---|---|---|
| 2005/0198591 A1* | 9/2005 | Jarrett et al. | 715/863 |
| 2006/0085767 A1* | 4/2006 | Hinckley et al. | 715/863 |
| 2006/0112354 A1* | 5/2006 | Park et al. | 715/835 |
| 2006/0168543 A1* | 7/2006 | Zaner-Godsey | G06Q 10/107 715/835 |
| 2006/0197779 A1* | 9/2006 | Gossman | 345/619 |
| 2006/0212812 A1* | 9/2006 | Simmons et al. | 715/539 |
| 2006/0230334 A1* | 10/2006 | Slawson | G06F 17/30265 715/202 |
| 2006/0267967 A1* | 11/2006 | Hinckley et al. | 345/179 |
| 2006/0274057 A1* | 12/2006 | Van Ness et al. | 345/179 |
| 2007/0109281 A1* | 5/2007 | Simmons et al. | 345/179 |
| 2007/0115264 A1* | 5/2007 | Yu et al. | 345/173 |
| 2007/0124503 A1* | 5/2007 | Ramos et al. | 709/248 |
| 2008/0150908 A1* | 6/2008 | Someno | 345/173 |
| 2008/0168403 A1* | 7/2008 | Westerman et al. | 715/863 |
| 2008/0229223 A1* | 9/2008 | Kake | 715/764 |
| 2008/0307361 A1* | 12/2008 | Louch et al. | 715/835 |
| 2009/0024965 A1* | 1/2009 | Zhdankin et al. | 715/863 |
| 2009/0160856 A1* | 6/2009 | Hoguet | 345/420 |
| 2009/0307623 A1* | 12/2009 | Agarawala et al. | 715/765 |
| 2009/0327954 A1* | 12/2009 | Danton et al. | 715/810 |
| 2010/0009748 A1* | 1/2010 | Timperley | 463/31 |
| 2010/0030921 A1* | 2/2010 | Kim | 710/10 |
| 2010/0033504 A1* | 2/2010 | Hart et al. | 345/660 |
| 2010/0042657 A1* | 2/2010 | Yue et al. | 707/200 |
| 2010/0077329 A1* | 3/2010 | Korn | 715/764 |
| 2010/0095248 A1* | 4/2010 | Karstens | 715/846 |
| 2010/0125787 A1* | 5/2010 | Chihara et al. | 715/702 |
| 2010/0185949 A1* | 7/2010 | Jaeger | 715/730 |
| 2010/0229129 A1* | 9/2010 | Price et al. | 715/863 |
| 2010/0318573 A1* | 12/2010 | Yoshikoshi | 707/802 |
| 2011/0029927 A1* | 2/2011 | Lietzke et al. | 715/835 |
| 2011/0035705 A1* | 2/2011 | Faenger et al. | 715/811 |
| 2011/0055279 A1* | 3/2011 | Terasaka | 707/792 |
| 2011/0069890 A1* | 3/2011 | Besley | 382/199 |
| 2011/0119624 A1* | 5/2011 | Coldefy et al. | 715/810 |
| 2011/0169762 A1* | 7/2011 | Weiss | 345/173 |
| 2011/0231428 A1* | 9/2011 | Kuramura | 707/769 |
| 2011/0276920 A1* | 11/2011 | Fong et al. | 715/810 |
| 2012/0026100 A1* | 2/2012 | Migos et al. | 345/173 |
| 2012/0105383 A1* | 5/2012 | Silverbrook et al. | 345/179 |
| 2015/0067600 A1* | 3/2015 | Steinberg | G06K 9/00208 715/822 |

OTHER PUBLICATIONS

"European Application Serial No. 11008558.6, Summons to Attend Oral Proceedings mailed Apr. 10, 2013", 9 pgs.

Apitz, Georg, et al., "Foundations for Designing and Evaluating User Interfaces Based on the Crossing Paradigm", ACM Transaction on Computer-Human Interactions, vol. 17, No. 2, Article 9, (May 2010), 44 pgs.

\* cited by examiner

GRAPHICAL MANIPULATION OF DATA OBJECTS

FIELD

The present disclosure relates generally to data processing. In an embodiment, the disclosure relates to graphical manipulation of data objects.

BACKGROUND

Data is stored in a variety of different structures, such as tables, arrays, and lists. To manage stored data, a user can select from a variety of computer languages. An example of such a computer language is Structured Query Language (SQL), which is a database computer language designed for managing data in relational database management systems. To use SQL, a user has to learn all the detailed syntax, language elements, and commands of SQL, such as clauses, expressions, predicates, and queries. Such a language takes a substantial time to learn and master. Furthermore, in order to manage data, the user has to learn and understand the data structures used to store the data, and take the time to type each SQL command to manage the data. As a result, using, for example, SQL to manage a large amount of data can be difficult, time consuming, and laborious.

SUMMARY

In one example, a method of manipulating properties of data objects that are stored in a database is provided. The method comprising: receiving a user input defining an enclosed, graphical shape on a video display; associating a property to the enclosed, graphical shape; identifying a number of graphical items being included within the enclosed, graphical shape, each graphical item in the number of graphical items being displayed on the video display and representing a data object from the data objects that are stored in the database; and based on the identification, associating the property associated with the enclosed, graphical shape to the data objects that are represented by the number of graphical items. In one example, the number of graphical items are dragged into the enclosed, graphical shape. In one example, the number of graphical items are created within the enclosed, graphical shape. In one example, the enclosed, graphical shape is created to surround the number of graphical items. In one example, the enclosed, graphical shape is a polygon. In one example, the property is stored in the database.

In one example, a computing device is provided. The computing device comprises at least one processor; and a memory in communication with the at least one processor, the memory being configured to store a visual modeling module that is executable by the at least one processor, the visual modeling module having instructions that when executed by the at least one processor, cause operations to be performed, the operations comprising: receiving a user input defining an enclosed, graphical shape on a video display; associating a property to the enclosed, graphical shape; identifying a number of graphical items being included within the enclosed, graphical shape, each graphical item in the number of graphical items being displayed on the video display and representing a data object from the data objects that are stored in the database; and based on the identification, associating the property associated with the enclosed, graphical shape to the data objects that are represented by the number of graphical items. In one example, the number of graphical items are dragged into the enclosed, graphical shape. In one example, the number of graphical items are created within the enclosed, graphical shape. In one example, the enclosed, graphical shape is created to surround the number of graphical items. In one example, the enclosed, graphical shape is a polygon. In one example, the property is stored in the database.

In one example, a non-transitory machine-readable medium is provided that stores instructions, which, when performed by a machine, cause the machine to perform operations comprising: associating a property to the enclosed, graphical shape; identifying a number of graphical items being included within the enclosed, graphical shape, each graphical item in the number of graphical items being displayed on the video display and representing a data object from the data objects that are stored in the database; and based on the identification, associating the property associated with the enclosed, graphical shape to the data objects that are represented by the number of graphical items. In one example, the number of graphical items are dragged into the enclosed, graphical shape. In one example, the number of graphical items are created within the enclosed, graphical shape. In one example, the enclosed, graphical shape is created to surround the number of graphical items. In one example, the enclosed, graphical shape is a polygon. In one example, the property is stored in the database.

In one example, a method of manipulating properties of data objects is provided. The method comprising: receiving a user input defining an enclosed, graphical shape on a video display; associating a property to the enclosed, graphical shape; identifying graphical items that are located outside of the enclosed, graphical shape, each graphical item being displayed on the video display and representing a data object that has a property; and identifying a number of the graphical items representing the number of data objects that have the property associated with the enclosed, graphical shape. In one example, the method further comprising moving the number of the graphical items inside the enclosed, graphical shape based on the identification of the number of graphical items. In one example, the identification of the number of graphical items comprises executing a query to a database that stores properties associated with the graphical items, the query to locate the number of data objects having properties that match the property associated with the enclosed, graphical shape. In one example, the method further comprising receiving an additional user input operated on the enclosed, graphical shape, wherein the number of the graphical items is identified based on the receipt of the additional user input. In one example, the receipt of the additional user input comprises detecting a line being drawn from outside of the enclosed, graphical shape to inside of the enclosed, graphical shape. In one example, the receipt of the additional user input comprising detecting a movement of a body part from outside of the enclosed, graphical shape to inside of the enclosed, graphical shape.

In one example, a computing device is provided. The computing device comprising: at least one processor; and a memory in communication with the at least one processor, the memory being configured to store a visual modeling module that is executable by the at least one processor, the visual modeling module having instructions that when executed by the at least one processor, cause operations to be performed, the operations comprising: receiving a user input defining an enclosed, graphical shape on a video display; associating a property to the enclosed, graphical shape; identifying graphical items that are located outside of the enclosed, graphical shape, each graphical item being displayed on the video display and representing a data object that has a property; and identifying a number of the graphical items representing a number of data objects that have the property associated with the enclosed, graphical shape. In one example, the operations further comprising moving the number of the graphical items inside the enclosed, graphical shape based on the identification of the number of graphical items. In one example, the operation of identifying the number of graphical items comprises executing a query to a database that stores properties associated with the graphical items, the query to locate the number of data objects having properties that match the property associated with the enclosed, graphical shape. In one example, the operations further comprising receiving an additional user input operated on the enclosed, graphical shape, wherein the number of the graphical items is identified based on the receipt of the additional user input. In one example, the operation of receiving the additional user input comprises detecting a line being drawn from outside of the enclosed, graphical shape to inside of the enclosed, graphical shape. In one example, the operation of receiving the additional user input comprising detecting a movement of a body part from outside of the enclosed, graphical shape to inside of the enclosed, graphical shape.

In one example, a non-transitory machine-readable medium is provided that stores instructions, which, when performed by a machine, cause the machine to perform operations comprising: receiving a user input defining an enclosed, graphical shape on a video display; associating a property to the enclosed, graphical shape; identifying graphical items that are located outside of the enclosed, graphical shape, each graphical item being displayed on the video display and representing a data object that has a property; and identifying a number of the graphical items representing the number of data objects that have the property associated with the enclosed, graphical shape. In one example, the operations further comprising moving the number of the graphical items inside the enclosed, graphical shape based on the identification of the number of graphical items. In one example, the operation of identifying the number of graphical items comprises executing a query to a database that stores properties associated with the graphical items, the query to locate the number of data objects having properties that match the property associated with the enclosed, graphical shape. In one example, the operations further comprising receiving an additional user input operated on the enclosed, graphical shape, wherein the number of the graphical items is identified based on the receipt of the additional user input. In one example, the operation of receiving the additional user input comprises detecting a line being drawn from outside of the enclosed, graphical shape to inside of the enclosed, graphical shape. In one example, the operation of receiving the additional user input comprising detecting a movement of a body part from outside of the enclosed, graphical shape to inside of the enclosed, graphical shape.

In one example, a method is provided. The method comprising: receiving a user input defining an enclosed, graphical shape on a video display; identifying a number of graphical items being included within the enclosed, graphical shape, each graphical item in the number of graphical items being displayed on the video display and representing a data object that has a number of properties; and extracting a property from the number of properties that the data objects have in common based on the identification. In one example, the method further comprising receiving an additional user input operated on the enclosed, graphical shape, wherein the property is extracted based on the receipt of the additional user input. In one example, the receipt of the additional user input comprises detecting a line being drawn from inside of the enclosed, graphical shape to outside of the enclosed, graphical shape. In one example, the receipt of the additional user input comprises detecting a movement of a body part from inside of the enclosed, graphical shape to outside of the enclosed, graphical shape. In one example, the extraction of the property comprises executing a query to a database that stores properties associated with the data objects, the query to locate the property. In one example, the property includes an attribute associated with the data objects. In one example, the property includes an association between two or more of the data objects. In one example, the enclosed, graphical shape is a polygon.

In one example, a computing device is provided. The computing device comprising: at least one processor; and a memory in communication with the at least one processor, the memory being configured to store a visual modeling module that is executable by the at least one processor, the visual modeling module having instructions that when executed by the at least one processor, cause operations to be performed, the operations comprising: receiving a user input defining an enclosed, graphical shape on a video display; identifying a number of graphical items being included within the enclosed, graphical shape, each graphical item in the number of graphical items being displayed on the video display and representing a data object that has a number of properties; and extracting a property from the number of properties that the data objects have in common based on the identification. In one example, the operations further comprising receiving an additional user input operated on the enclosed, graphical shape, wherein the property is extracted based on the receipt of the additional user input. In one example, the receipt of the additional user input comprises detecting a line being drawn from inside of the enclosed, graphical shape to outside of the enclosed, graphical shape. In one example, the receipt of the additional user input comprises detecting a movement of a body part from inside of the enclosed, graphical shape to outside of the enclosed, graphical shape. In one example, the extraction of the property comprises executing a query to a database that stores properties associated with the data objects, the query to locate the property. In one example, the enclosed, graphical shape is a figure bounded by a closed path.

In one example, a non-transitory machine-readable medium is provided that stores instructions, which, when performed by a machine, cause the machine to perform operations comprising: receiving a user input defining an enclosed, graphical shape on a video display; identifying a number of graphical items being included within the enclosed, graphical shape, each graphical item in the number of graphical items being displayed on the video display and representing a data object that has a number of properties; and extracting a property from the number of properties that the data objects have in common based on the identification. In one example, operations further comprising receiving an additional user input operated on the enclosed, graphical shape, wherein the property is extracted based on the receipt of the additional user input. In one example, the operation of receiving the additional user input comprises detecting a line being drawn from inside of the enclosed, graphical shape to outside of the enclosed, graphical shape. In one example, the operation of receiving the additional user input comprises detecting a movement of a body part from inside of the enclosed, graphical shape to outside of the enclosed, graphical shape. In one example, the operation of extracting the property comprises executing a query to a database that stores properties associated with the data objects, the query to locate the property.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide various techniques for manipulating data objects with use of graphical user interfaces. In general, data objects stored using a variety of different data structures are represented as graphical items in a graphical user interface. As explained in more detail below, a user can manipulate properties of the data objects and/or the data objects themselves by interacting with the graphical items.

Figure 1:
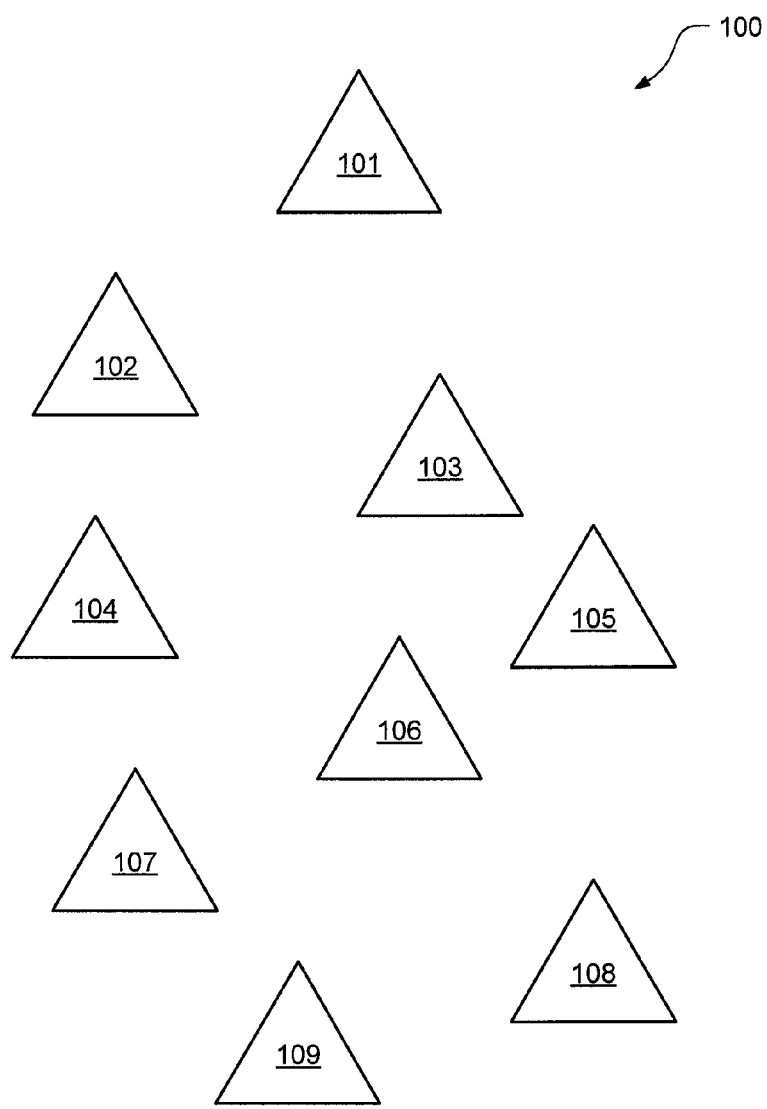
FIG. 1 is a graphical user interface illustrating a number of data objects, in accordance with an example embodiment.

FIG. 1 is a graphical user interface 100 illustrating a number of data objects, in accordance with an example embodiment. A "data object," as used herein, refers to an entity that can be manipulated by the commands of a programming language. Data objects can include a value, a variable, a function, a data structure, or other data objects that represent, quantify, or embody any suitable thing. As an example, a physical thing (e.g., a car, a person, or a computer) may be defined or embodied as a data object. In another example, an object of thought or concept (e.g., a business plan or an architectural design) may also be defined or embodied as a data object. In yet another example, a non-tangible thing (e.g., work to be done or video file) may also be defined or embodied as a data object.

In a graphical user interface displayed on a video display, one or more data objects are represented by a graphical item. As depicted in FIG. 1, the graphical user interface 100 depicts multiple graphical items 101-109, with each graphical item 101-109 depicting or representing at least one data object. Any suitable graphical item can be used to represent a data object on a video display. In FIG. 1, graphical items 101-109 are in the form of triangles, but it should be appreciated that other graphical items can be used, such as rectangles, circles, ovals, squares, trapezoid, spheres, cubes, and other suitable graphics. As explained in more detail below, a user can use the graphical user interface 100 to manipulate properties of the data objects by interacting with their respective graphical items 101-109.

Figure 2:
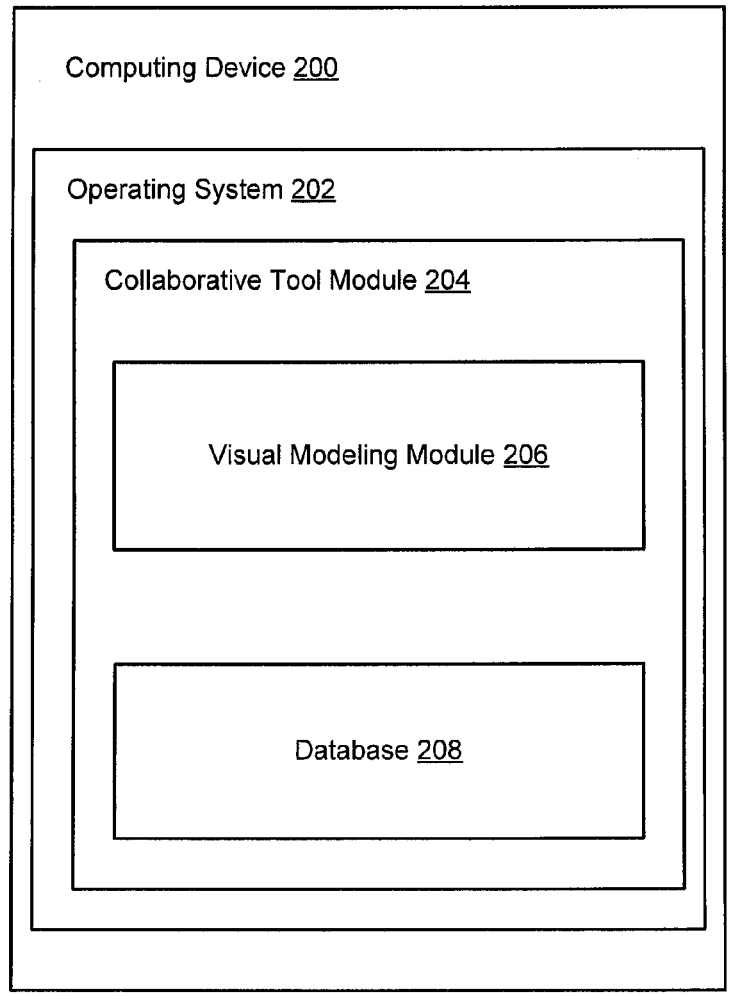
FIG. 2 is a block diagram depicting a visual modeling module, consistent with an example embodiment, that is embodied in a computing device.

FIG. 2 is a block diagram depicting a visual modeling module 206, consistent with an example embodiment, that is embodied in a computing device 200. It should be appreciated that the computing device 200 may be deployed in the form of, for example, a personal computer, a laptop computer, a server computer, a tablet personal computer, a smart phone, a personal digital assistant, or other computing devices. In various embodiments, the computing device 200 may be used to implement computer programs, logic, applications, methods, processes, or software to graphically manipulate data objects, as described in more detail below.

In the example depicted in FIG. 2, the computing device 200 executes an operating system 202 that manages other software processes and/or services executing on the computing device 200. In one embodiment, the software processes and/or services may include a collaborative tool module 204, which allows users to share documents and other data and provides various structure and tools used in brainstorming and decision making processes. Here, the collaborative tool module 204 may include a visual modeling module 206 and a database 208 that is configured to or structured to store, in one embodiment, properties associated with the data objects. A "property," as used herein, refers to a characteristic of a data object. In one example, the property includes an association and an attribute. An "association" refers to a connection between two or more data objects. An "attribute" refers to a quality or feature belonging to one or more data objects. Examples of attributes include size, shape, color, category, and other attributes. It should be appreciated that in addition to the database 208, the data objects and/or properties associated with the data objects may also be stored in other files, such as an Extensible Markup Language (XML) document, spreadsheet, and other files.

The visual modeling module 206 provides a graphical user interface that functions to provide a user with the ability to manipulate data objects and/or properties of the data objects, as stored in the database 208. For example, as explained in more detail below, the visual modeling module 206 can display representations of data objects in the form of graphical items, such as the graphical items 101-109 depicted in FIG. 1, and through interactions with these graphical items, one or more users in a collaborative session using the collaborative tool module 202 to share data (e.g., data objects) can manipulate properties of these data objects.

In addition to the collaborative tool module 204, the visual modeling module 206 may be embodied in a variety of other applications or services. In an alternate embodiment, the visual modeling module 206 may be embodied within a SQL database application for use in, for example, creating queries to the database 208. Accordingly, it should be appreciated that in other embodiments, the computing device 200 may include fewer, more, or different modules apart from those shown in FIG. 2. For example, in yet another embodiment, the database 208 may be excluded from the collaborative tool module 204. Instead, the database 208 may be stored at a different computing device or storage system.

Figure 3:
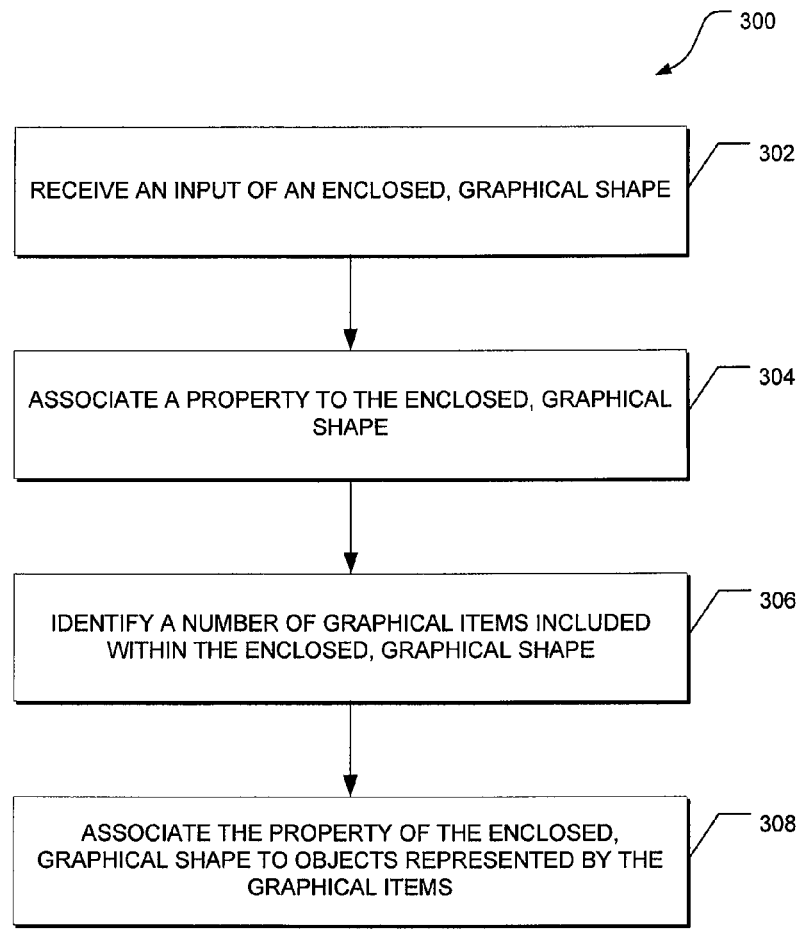
FIG. 3 depicts a flow diagram of a general overview of a method, in accordance with an embodiment, for manipulating properties of data objects.

FIG. 3 depicts a flow diagram of a general overview of a method 300, in accordance with an embodiment, for manipulating properties of data objects. In an example embodiment, the method 300 may be implemented by the visual modeling module 206 and employed in the computing device 200 depicted in FIG. 2. Referring to FIG. 3, the visual modeling module, for example, receives at least one input defining an enclosed, graphical shape at 302. As used herein, an "enclosed, graphical shape" refers to a polygon or other graphic having a completely closed or substantially closed plane figure having three or more sides. In other words, an enclosed, graphical shape is a figure bounded by a closed or substantially closed path. Such an enclosed, graphical shape is defined on a video display. Examples of enclosed, graphical shapes include a circle, a triangle, a square, and other figures. The enclosed, graphical shape may be inputted by a user. For example, a user can draw the enclosed, graphical shape within a graphical user interface. Alternatively, a user may input the enclosed, graphical shape by selecting the shape from a template. In an alternate embodiment, a user may press a key to trigger the generation of the enclosed, graphical shape in a graphical user interface.

With the user input of the enclosed, graphical shape, at least one property may then be associated to the enclosed, graphical shape at 304. For example, in one embodiment, a user may select one or more properties and assign these selected properties to the enclosed, graphical shape. Alternatively, these properties can be automatically assigned to the enclosed, graphical shape.

With a property associated to the enclosed, graphical shape, a visual modeling module, for example, may then identify a number of graphical items that are included within the enclosed, graphical shape at 306. As discussed above, each graphical item represents one or more data objects. In one example, identification can be made by identifying all the graphical items that are encompassed within the boundaries of the enclosed, graphical shape. Once these graphical items are identified, the property associated with the enclosed, graphical shape may then be associated or assigned to the data objects that are represented by the graphical items at 308.

Figure 4A:
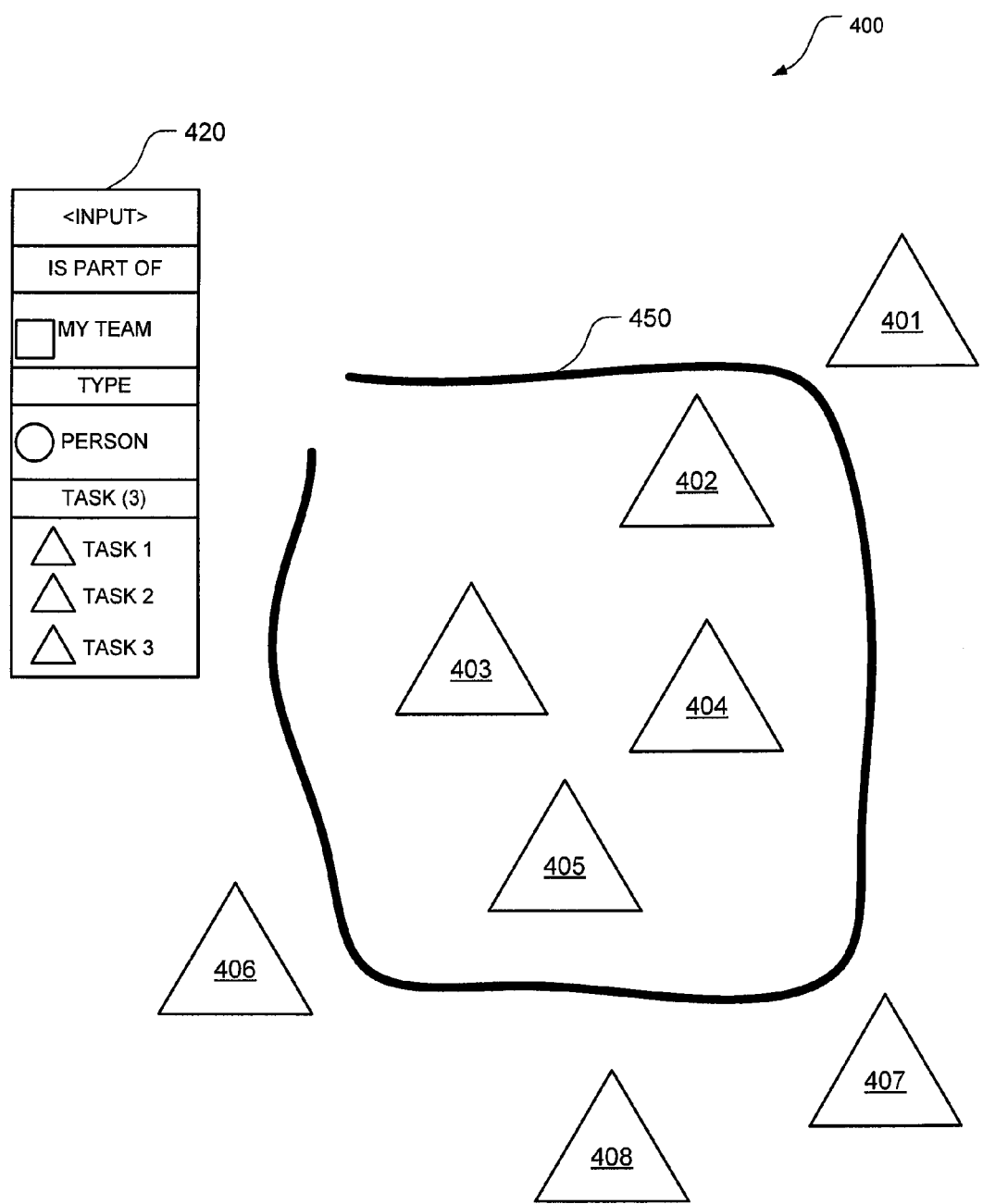
FIGS. 4A and 4B are graphical user interfaces that illustrate an association of properties to a group of data objects, in accordance with an example embodiment.
Figure 4B:
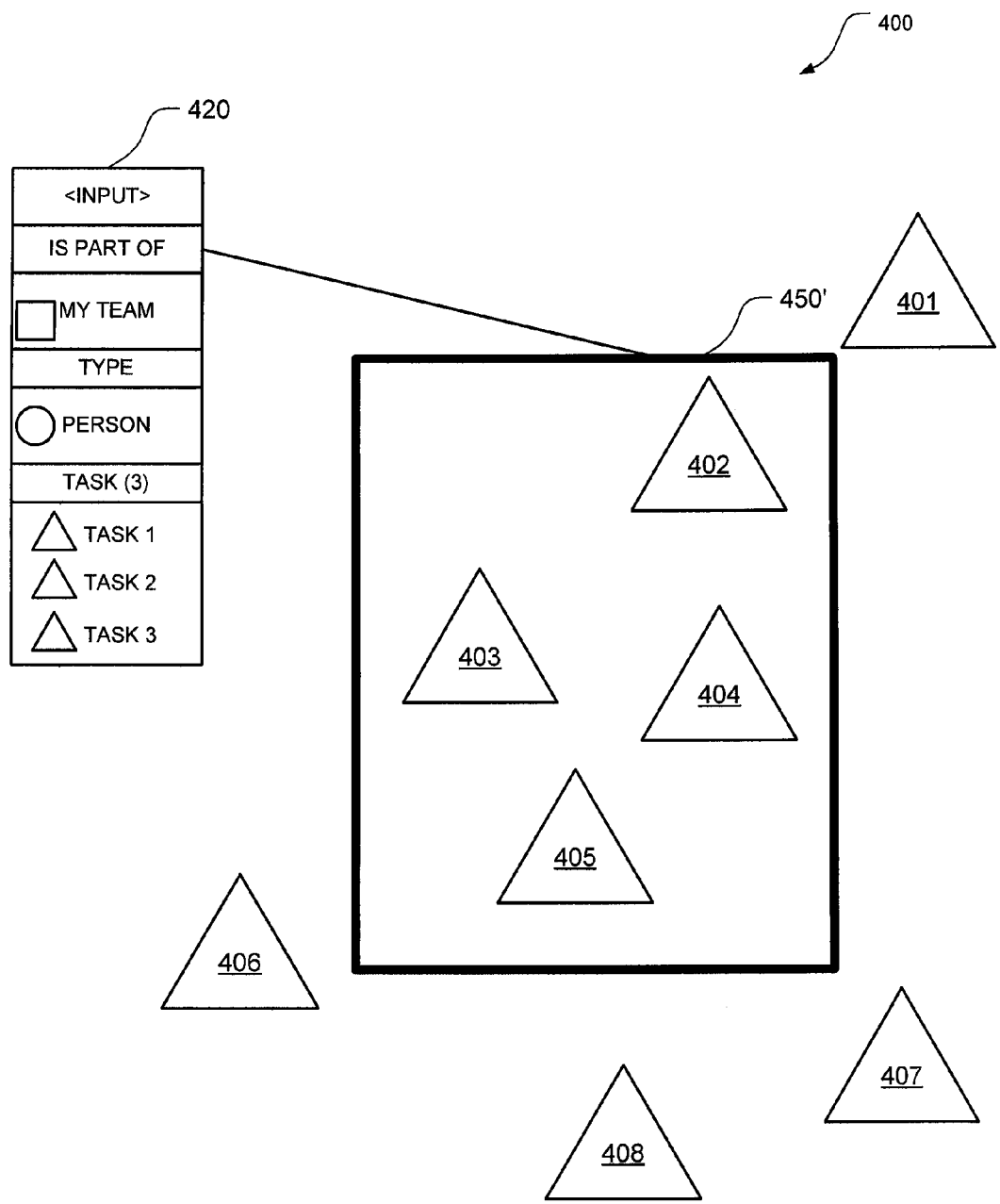

FIGS. 4A and 4B are graphical user interfaces 400 that illustrate an association of properties to a group of data objects, in accordance with an example embodiment. As depicted, the graphical user interface 400 includes depictions of various data objects 401-408 that, in one embodiment, are stored in a database. Additionally depicted is a graphical region 420 that lists various properties.

As depicted in FIG. 4A, the graphical user interface 400 includes various graphical items 401-408 and, in this example, a user may want to associate properties (e.g., "Type: Person" and "Is Part of: My Team") listed in graphical region 420 to data objects represented by a subset of graphical items 402-405. To create this association, a user draws a line 450 to surround the graphical items 402-405. In one embodiment, a visual modeling module, for example, detects the user input of the line 450 and fits the line 450 with an enclosed, graphical shape that best approximates the line 450. For example, as depicted in FIG. 4B, based on the shape of the line 450 illustrated in FIG. 4A, the visual modeling module identifies and generates an enclosed, graphical shape 450' in the form of a rectangle to replace the line 450.

The user may then associate properties listed in graphical region 420 to the enclosed, graphical shape 450' by, for example, drawing a line from the graphical region 422, which lists the properties, to the enclosed, graphical shape 450'. This line connecting the graphical region 420 to the enclosed, graphical shape 450' shows an association between the properties listed in the graphical region 420 and the enclosed, graphical shape 450'. The visual modeling module identifies that the graphical items 402-405 are included within the enclosed, graphical shape 450' and accordingly, associates the properties listed in graphical region 420 to all the data objects represented by the graphical items 402-405 included within the enclosed, graphical shape 450'.

It should be appreciated that the user can input the enclosed, graphical shape 450' by, for example, drawing the enclosed, graphical shape with a mouse in communication with a computing device or with a finger or other body parts on a touch sensitive video display. As a result, instead of manually typing the properties for each data object, a user in this embodiment simply has to draw an enclosed, graphical shape 450' around a group of data objects (as represented by graphical items 402-405) and the properties are automatically associated with the group. This graphical technique may provide a quick way for a user to assign properties to a large number of data objects without the need to learn a complex data access computer language.

Figure 5:
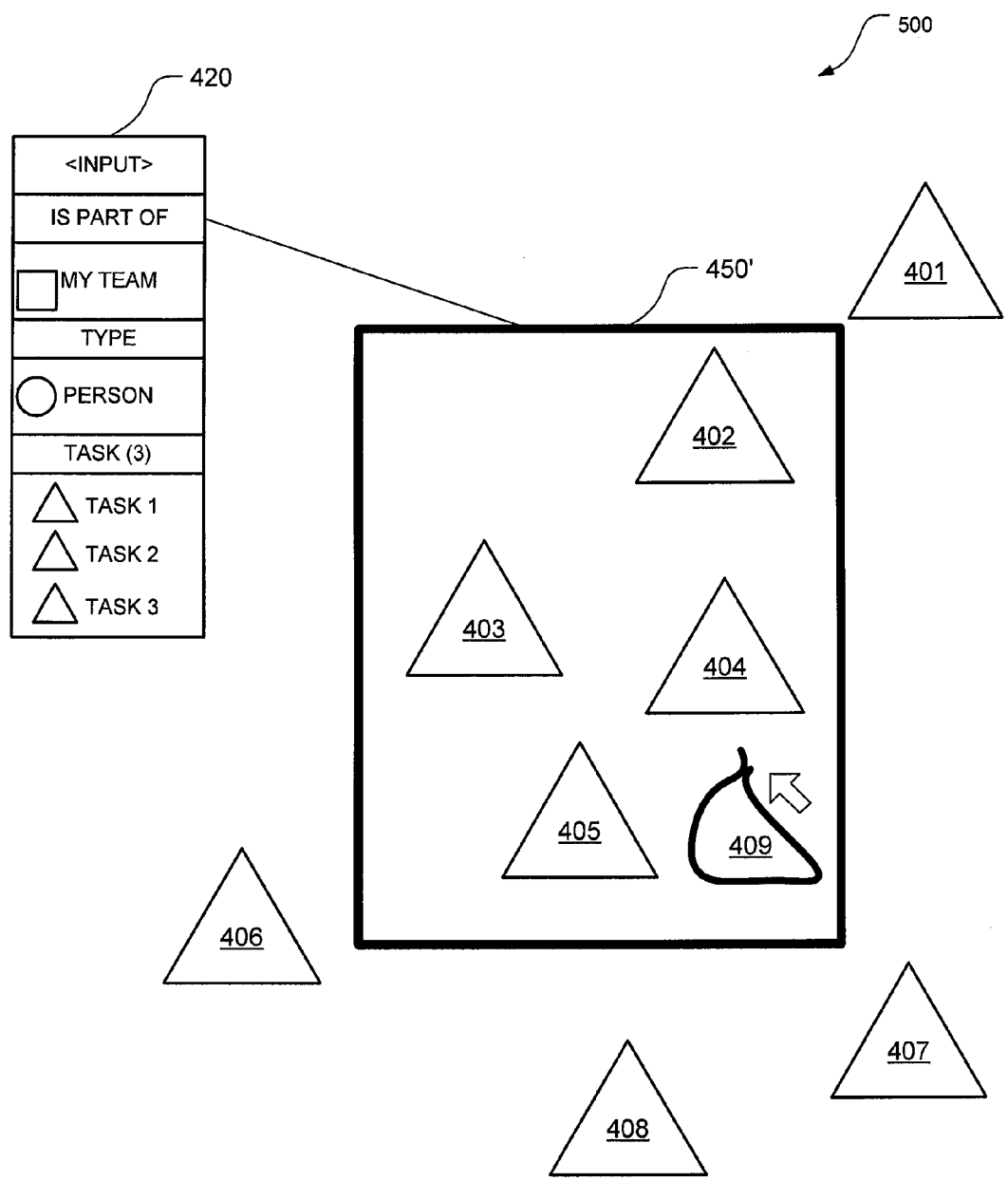
FIG. 5 is a graphical user interface that illustrates a creation of a graphical item within an enclosed, graphical shape, in accordance with an example embodiment.

In addition to drawing the enclosed, graphical shape 450' to surround graphical items 402-405, there are other techniques to include the graphical items 402-405 or other graphical items within the enclosed, graphical shape 450'. For example, FIG. 5 is a graphical user interface 500 that illustrates the creation of a graphical item within an enclosed, graphical shape, in accordance with another example embodiment. As depicted, a user may simply create or draw a graphical item 409, which represents a data object, within the enclosed, graphical shape 450'. With the creation of the graphical item 409 within the enclosed, graphical shape 450', the properties associated with the enclosed, graphical shape 450' are then automatically associated with the data object represented by graphical item 409.

Figure 6:
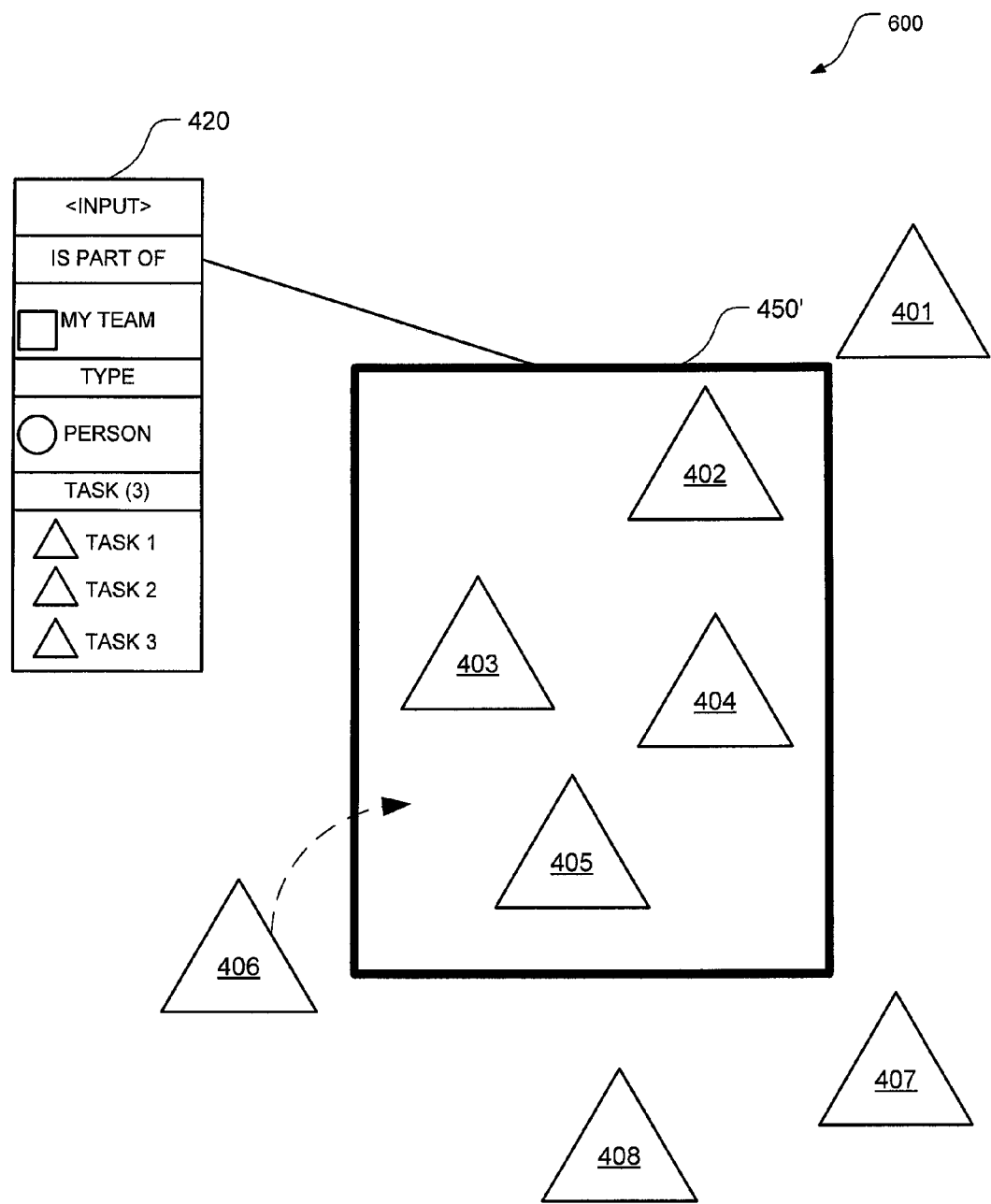
FIG. 6 is a graphical user interface that illustrates a creation of a graphical item within an enclosed, graphical shape, in accordance with another example embodiment.

FIG. 6 is a graphical user interface 600 that illustrates the creation of a graphical item within an enclosed, graphical shape, in accordance with yet another example embodiment. As depicted, a user can move the graphical item 406 from outside of the enclosed, graphical shape 450' to inside of the shape 450'. In particular, the user can select the graphical item 406 within the graphical user interface 600 and thereafter drag the graphical item 406 into the boundaries of the enclosed, graphical shape 450'. Once the graphical item 406 is identified to be included within the enclosed, graphical shape 450', the properties listed in graphical region 420 are automatically associated to the data object as represented by graphical item 406.

Figure 7:
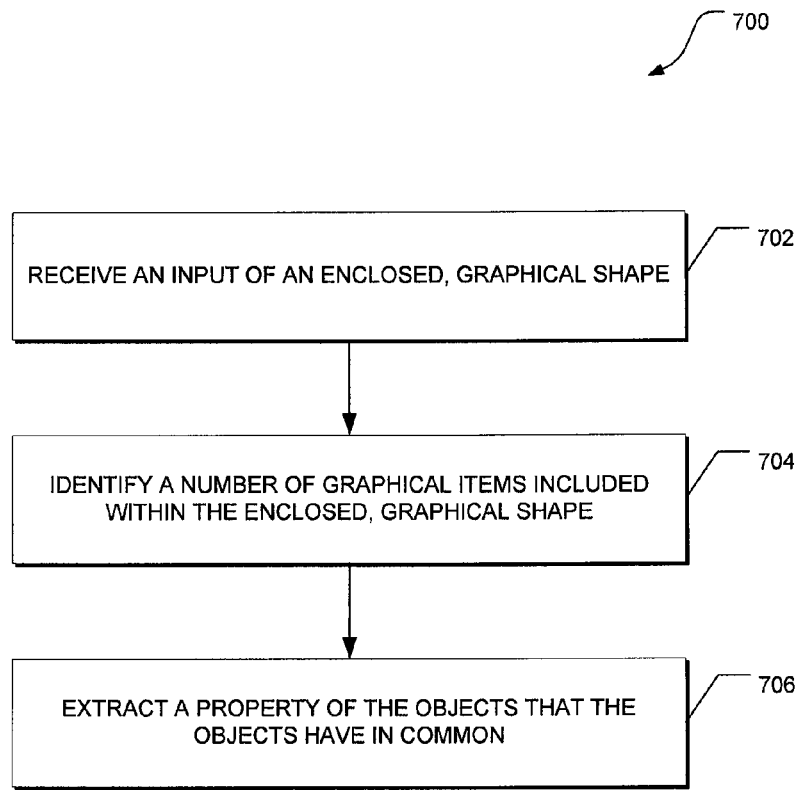
FIG. 7 depicts a flow diagram of a general overview of a method, in accordance with an alternate embodiment, for manipulating properties of data objects.

FIG. 7 depicts a flow diagram of a general overview of a method 700, in accordance with an alternate embodiment, for manipulating properties of data objects. The method 700 may be implemented by the visual modeling module 206 and employed in the computing device 200 depicted in FIG. 2. As depicted in FIG. 7, a user input defining an enclosed, graphical shape is received at 702. Thereafter, a number of graphical items are identified to be included within the enclosed, graphical shape at 704. Based on this identification, one or more properties of the data objects that the data objects have in common are extracted at 706. In other words, various properties that the data objects have in common may be extracted based on the identification that the graphical items representing the data objects are included within the enclosed, graphical shape. In particular, the extraction may include executing a query to locate or identify the common properties, as explained in more detail below.

Figure 8:
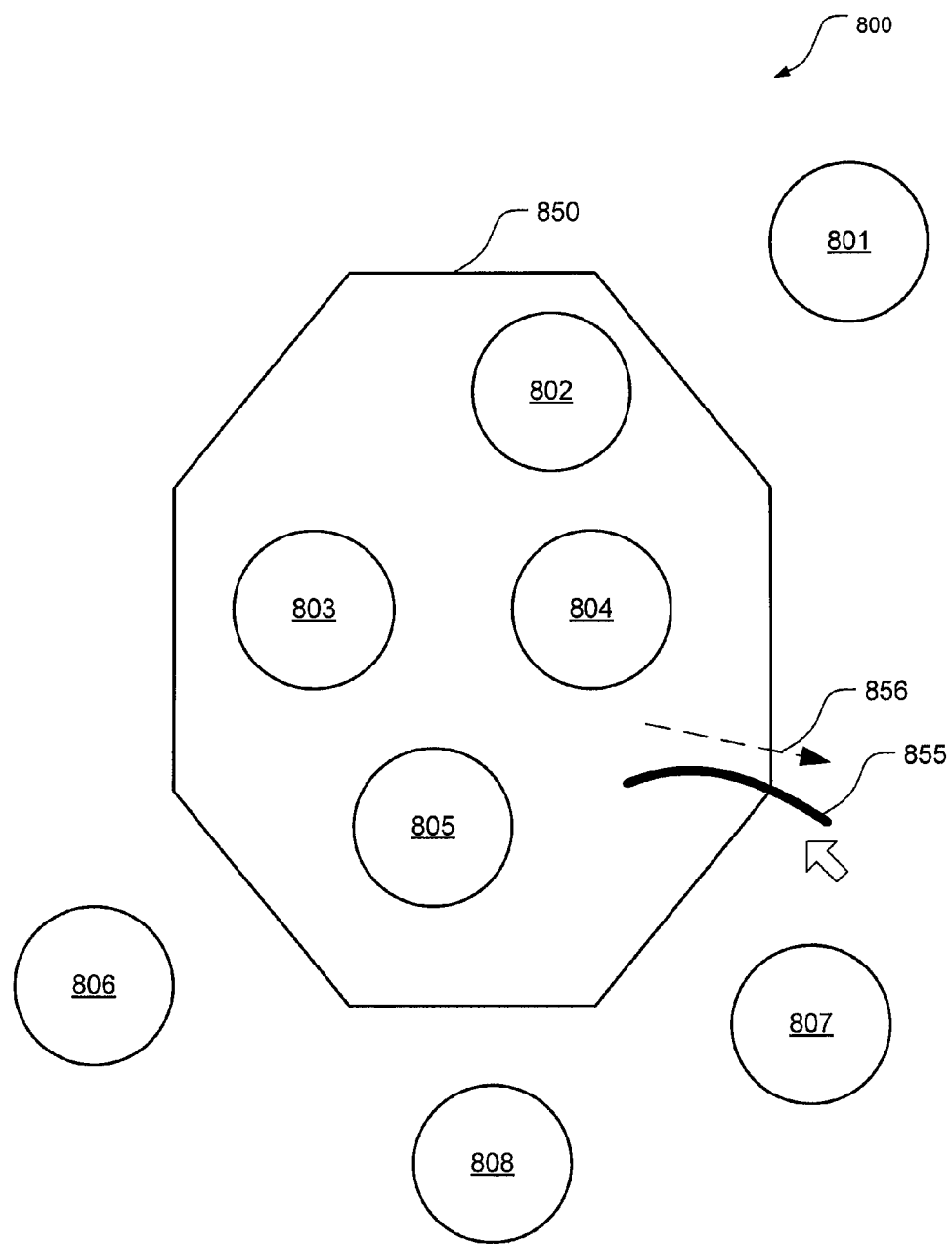
FIG. 8 depicts a graphical user interface illustrating the extraction of a set of common properties, in accordance with an example embodiment.

FIG. 8 depicts a graphical user interface 800 illustrating the extraction of a set of common properties, in accordance with an example embodiment. As depicted, the graphical user interface 800 includes multiple graphical items 801-808, each representing one or more data objects. In this example, a visual modeling module, such as the visual modeling module 206 depicted in FIG. 2, receives a user input defining an enclosed, graphical shape 850 and identifies a number of graphical items 802-805 that are included within the enclosed, graphical shape 850.

The visual modeling module also receives an additional user input operated on the enclosed, graphical shape 850 to initiate the extraction. For example, in the embodiment depicted in FIG. 8, this additional user input may be in the form of a user drawing a line 855 starting from inside of the enclosed, graphical shape 850 to end at outside of the shape 850 in the direction indicated by reference arrow 856. Upon detection of the line 855 being drawn, the visual modeling module then extracts one or more properties of the data objects, as represented by graphical items 802-805, that the data objects have in common. For example, each data object may have a property that includes a list of contact names. Upon detection of the line 855 being drawn from inside to outside of the enclosed, graphical shape 850, the visual modeling module can, in one embodiment, execute a query to a database of properties to identify or locate a set of common properties between the objects. A "query," as used herein, refers to an inquiry about data. The query may be constructed from words, numbers, symbols, and other alphanumeric characters. In response to the query, a database management system may, for example, identify the name "John Jones" from the database as a common contact name between the data objects represented by graphical items 802-805.

As a result, instead taking the time to learn a database computer language and to manually type the commands to query the properties, a user, in one example embodiment, simply has to draw a line from inside the enclosed, graphical shape 850 to outside of the same shape 850, thereby providing the user with a quick way to identify common properties. In addition to drawing a line, there are a variety of other user input techniques for initiating the extraction. In an alternate embodiment, the receipt of the additional user input can include detecting a movement of a finger or different body part from inside of the enclosed, graphical shape 850 to outside the shape 850. As an example, a user can draw such a line 855 with his finger using a touch sensitive video display or touchpad. Other alternative user input techniques include inputs using a keyboard, a mouse, a pen tablet, or other suitable user input techniques.

Figure 9:
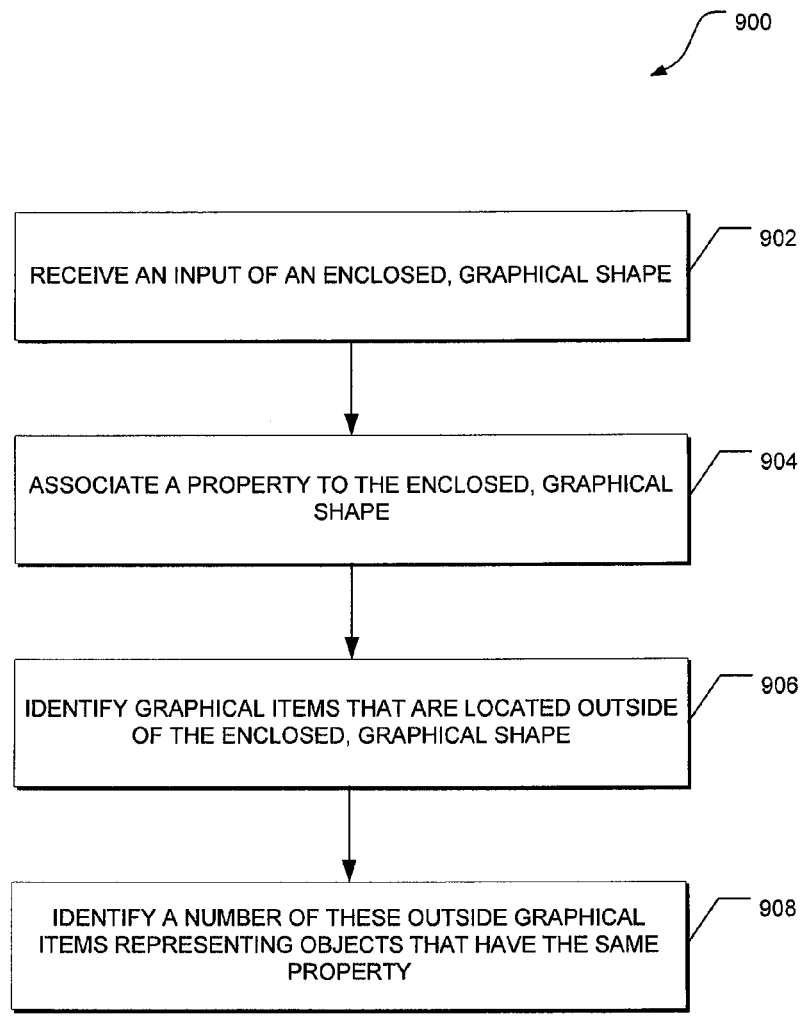
FIG. 9 depicts a flow diagram of a general overview of a method, in accordance with an embodiment, for identifying a number data objects that have common properties.

FIG. 9 depicts a flow diagram of a general overview of a method 900, in accordance with an embodiment, for identifying a number of data objects that have common properties. The method 900 may be implemented by the visual modeling module 206 and employed in the computing device 200 depicted in FIG. 2. As depicted in FIG. 9, a user input defining an enclosed, graphical shape is received at 902, and upon receipt, one or more properties are associated with the enclosed, graphical shape at 904.

The visual modeling module, at 906, identifies all the graphical items that are located outside the enclosed, graphical shape. Thereafter, at 908, the visual modeling module identifies a subset of (or all) the outside graphical items that represent data objects having the same property as the property associated with the enclosed, graphical shape. In one embodiment, the identification can be made by executing a query to a database of properties to locate and identify the set of data objects having the same property. As illustrated in more detail below, the identified graphical items representing the identified data objects may then be moved inside the enclosed, graphical shape.

Figure 10A:
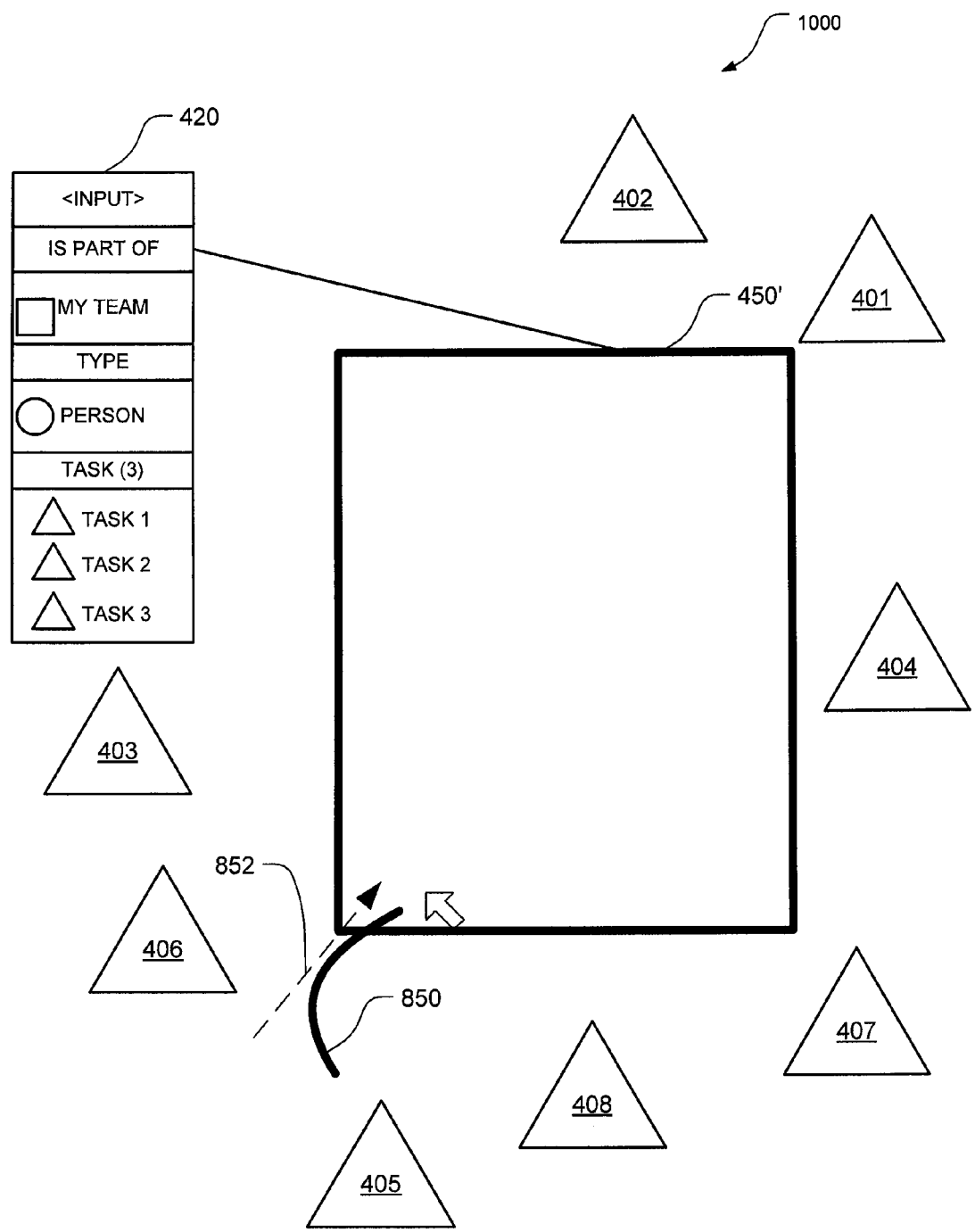
FIGS. 10A and 10B are graphical user interfaces that depict the identification other data objects that have common properties, in accordance with an example embodiment.
Figure 10B:
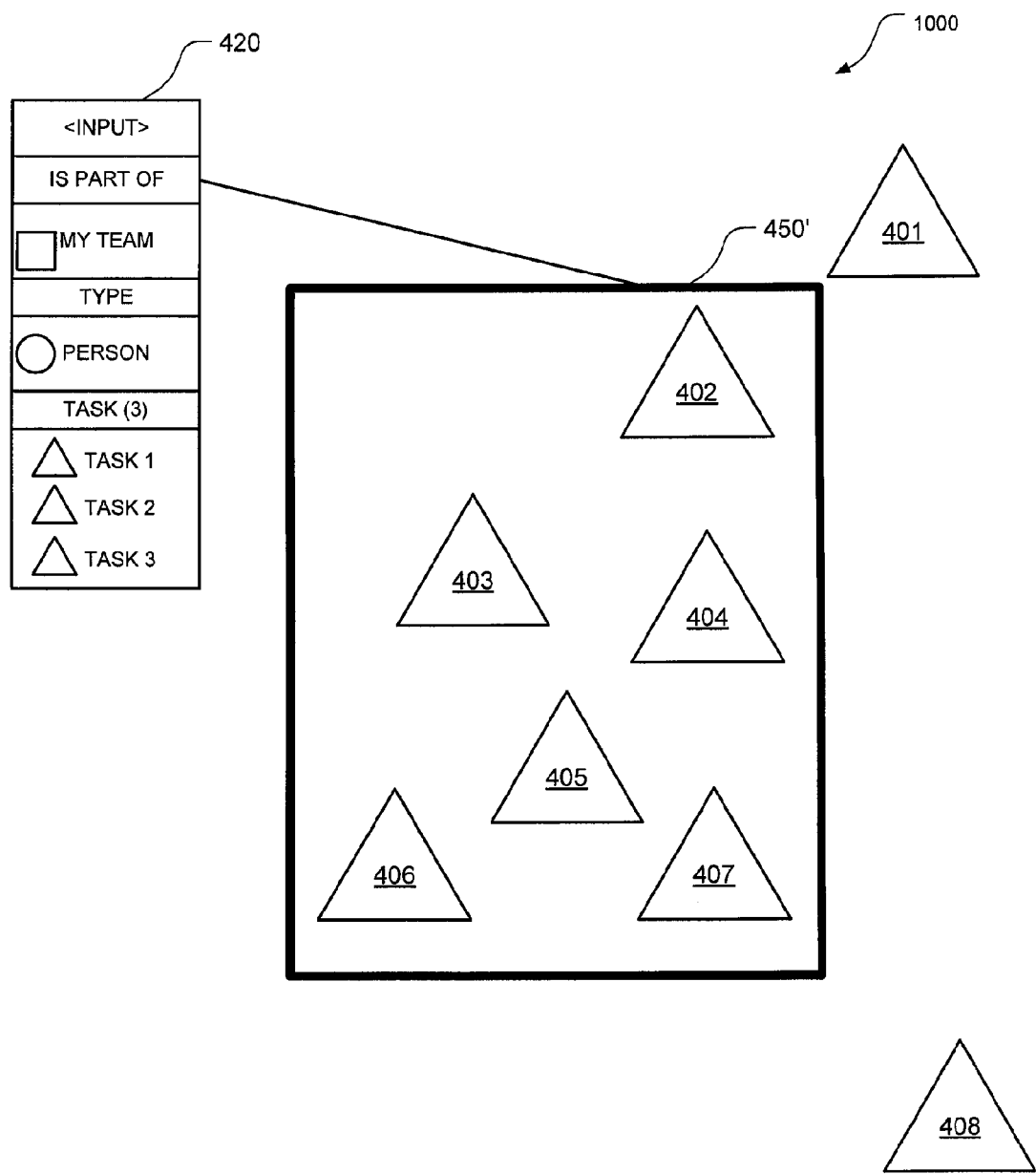

FIGS. 10A and 10B are graphical user interfaces 1000 that depict the identification other data objects that have common properties, in accordance with an example embodiment. As depicted in FIG. 10A, the graphical user interface 1000 depicts a number of graphical items 401-408, each of which represents one or more data objects. In this example, an enclosed, graphical shape 450' has been created. The graphical user interface 1000 also includes a graphical user region 420 that lists various properties associated with the enclosed, graphical shape 450'.

A user may want to identify all data objects outside the enclosed, graphical shape form 450' that have the same properties listed in graphical region 420. To initiate the identification, a user can provide an input operated on the enclosed, graphical shape 450'. In the embodiment depicted in FIG. 10A, the user may simply draw a line 850 starting from outside the enclosed, graphical shape 450' to end inside of the shape 450 in the direction as indicated by reference arrow 852. Alternatively, the identification can be triggered by detecting a movement of a finger from outside the enclosed, graphical shape 450' to inside of the same shape 450' through use of a touch sensitive video display.

Upon detection of the line 850 drawn from outside in, the visual modeling module can identify the data objects by executing a query to a database that stores properties associated with all the graphical items 401-408 outside of the enclosed, graphical shape 450'. This query is constructed to locate data objects having one or more properties that match the property associated with the enclosed, graphical shape 450'. In one embodiment, graphical items that are identified to have the same properties are then moved into the enclosed, graphical shape 450'. For example, as depicted in FIG. 10B, data objects as represented by graphical items 402-407 are identified to have the same properties as the properties associated with the enclosed, graphical shape 450'. As a result, the graphical items 402-407 are automatically moved from outside the enclosed, graphical shape 450' to inside of the shape 450'.

As a result, instead taking the time to learn a database computer language and to manually type the commands to query the properties, a user, in one example embodiment, simply has to draw a line from outside the enclosed, graphical shape 450' to inside the same shape 450', thereby providing the user with a quick way to identify other data objects with common properties.

Figure 11:
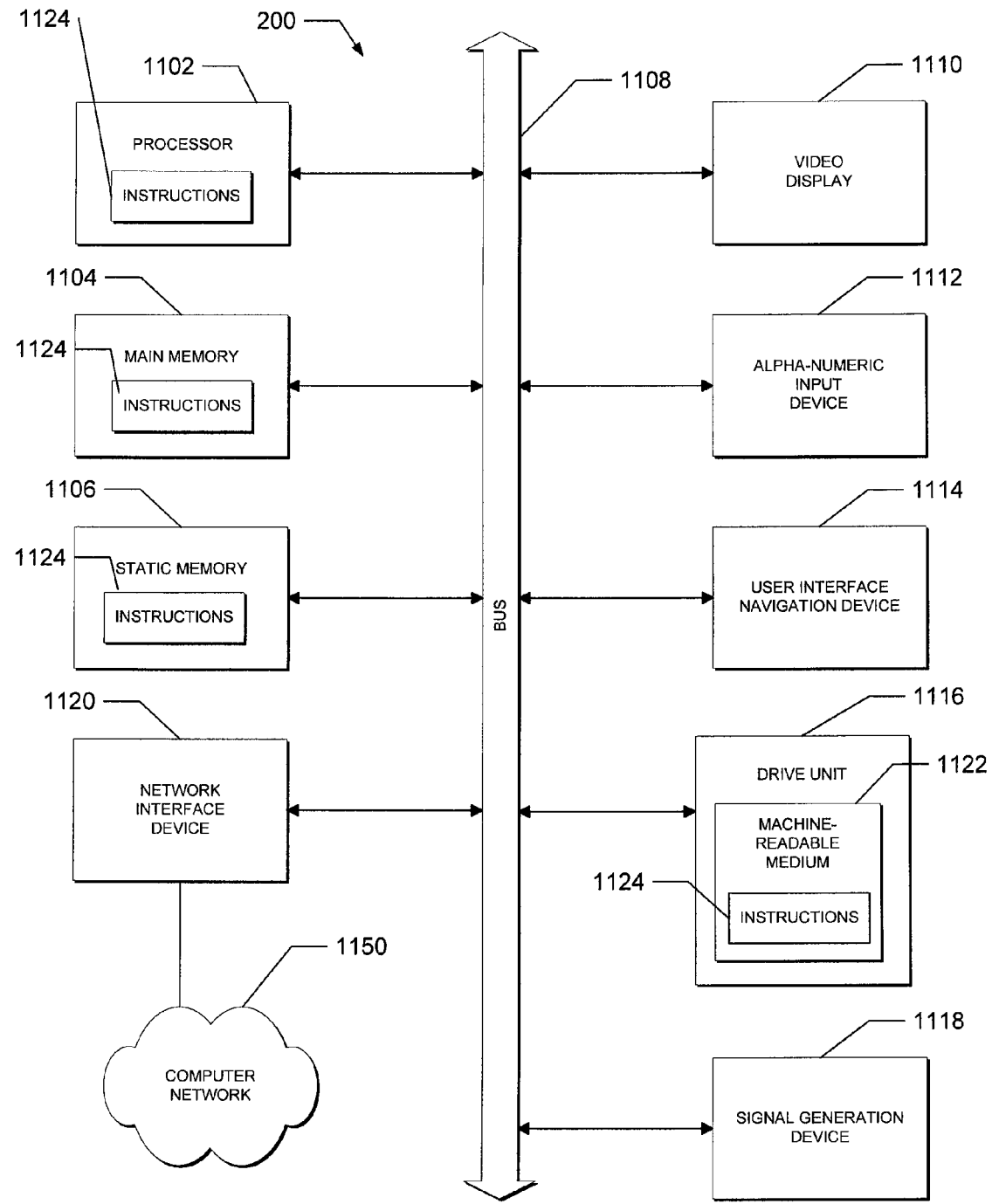
FIG. 11 depicts a block diagram of a machine in the example form of a computing device within which may be executed a set of instructions for causing the machine to perform any one or more of the methodologies discussed herein.

FIG. 11 depicts a block diagram of a machine in the example form of a computing device 200 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 200 includes a processor 1102 (e.g., a central processing unit (CPU), a graphics processing unit (GPU) or both), a main memory 1104 (e.g., random access memory), and static memory 1106 (e.g., static random-access memory), which communicate with each other via bus 1108. The computing device 200 may further include video display unit 1110 (e.g., a plasma display, a liquid crystal display (LCD) or a cathode ray tube (CRT)). The computing device 200 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120.

The disk drive unit 1116 (a type of non-volatile memory storage) includes a machine-readable medium 1122 on which is stored one or more sets of data structures and instructions 1124 (e.g., software) embodying or utilized by any one or more of the methodologies or functions described herein. The data structures and instructions 1124 may also reside, completely or at least partially, within the main memory 1104 and/or within the processor 1102 during execution thereof by computing device 200, with the main memory 1104 and processor 1102 also constituting machine-readable, tangible media.

The data structures and instructions 1124 may further be transmitted or received over a computer network 1150 via network interface device 1120 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 200) or one or more hardware modules of a computer system (e.g., a processor 1102 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1102 configured using software, the general-purpose processor 1102 may be configured as respective different hardware modules at different times. Software may accordingly configure a processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine, but deployed across a number of machines. In some example embodiments, the processors 1102 may be located in a single location (e.g., within a home environment, an office environment or as a server farm), while in other embodiments the processors 1102 may be distributed across a number of locations.

While the embodiment(s) is (are) described with reference to various implementations and exploitations, it will be understood that these embodiments are illustrative and that the scope of the embodiment(s) is not limited to them. In general, techniques for manipulating data objects may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method for sharing visual data on a video display during a collaborative session with multiple users using a database application, the method comprising:
   displaying graphical items on the video display, each graphical item represented by one or more data objects having at least one property stored in a database of properties accessible to the database application;
   receiving a user input defining an enclosed, graphical shape on the video display, the enclosed, graphical shape drawn around a set of graphical items from the displayed graphical items, the set of graphical items within the enclosed, graphical shape associated with a set of data objects;
   receiving additional user input to operate on the enclosed, graphical shape to initiate an extraction of a set of common properties associated with the set of data objects from the set of graphical items within the enclosed, graphical shape;
   extracting, in response to receiving the additional user input to operate on the enclosed, graphical shape, the set of common properties associated with the set of data objects from the set of graphical items within the enclosed, graphical shape by having the database application query the database of properties;
   automatically identifying at least one graphical item located outside the enclosed, graphical shape that includes the common set of properties associated with the set of data objects from the set of graphical items within the enclosed graphical shape; and
   in response to the identified at least one graphical item, moving the identified at least one graphical item located outside the enclosed, graphical shape inside the enclosed, graphical shape.

2. The method of claim 1, wherein the receiving the additional user input comprises detecting a line being drawn from inside of the enclosed, graphical shape to outside of the enclosed, graphical shape.

3. The method of claim 1, wherein the receiving the additional user input comprises detecting a movement of a body part from inside of the enclosed, graphical shape to outside of the enclosed, graphical shape.

4. The method of claim 1, wherein the at least one property includes an attribute associated with the data objects.

5. The method of claim 1, wherein each graphical items is represented by two or more data objects and the at least one property includes an association between two or more of the data objects.

6. The method of claim 1, further comprising:
   receiving a new user input defining a new graphical item within the enclosed graphical shape representing at least one new data object; and
   automatically associating the extracted set of common properties to the at least one new data object represented by the new graphical item.

7. The method of claim 1, further comprising:
   in response to extracting the set of common properties associated with the set of data objects within the enclosed, graphical shape, associating the enclosed, graphical shape with the set of common properties associated with the set of data objects from the set of graphical items within the enclosed, graphical shape.

8. The method of claim 7, further comprising:
   updating the set of common properties associated with the enclosed, graphical shape by associating a new property with the enclosed, graphical shape.

9. The method of claim 8, wherein updating the set of common properties associated with the set of data objects associated with the enclosed, graphical shape by associating a new property with the enclosed, graphical shape further comprising:
   displaying the new property in the graphical region listing the various properties; and
   receiving a command indicating a line drawn from the new property within the graphical regions to the enclosed, graphical shape displayed on the video display.

10. The method of claim 1, further comprising:
    displaying, on the video display, the set of common properties associated with the set of data objects from the set of graphical items within the enclosed, graphical shape, in a graphical region that lists various properties.

11. A computing device for sharing visual data on a video display during a collaborative session with multiple users using a database application, the computing device comprising:
    at least one processor; and
    a memory in communication with the at least one processor, the memory configured to store instructions that when executed by the at least one processor, causes operations to be performed, the operations comprising:
    displaying graphical items on the video display, each graphical item represented by one or more data objects having at least one property stored in a database of properties accessible to the database application;
    receiving a user input defining an enclosed, graphical shape on the video display, the enclosed, graphical shape drawn around a set of graphical items from the displayed graphical items, the set of graphical items within the enclosed, graphical shape associated with a set of data objects;
    receiving additional user input to operate on the enclosed, graphical shape to initiate an extraction of a set of common properties associated with the set of data objects from the set of graphical items within the enclosed, graphical shape;
    extracting, in response to receiving the additional user input to operate on the enclosed, graphical shape, the set of common properties associated with the set of data objects from the set of graphical items within the enclosed, graphical shape by having the database application query the database of properties;
    automatically identifying at least one graphical item located outside the enclosed, graphical shape that includes the common set of properties associated with the set of data objects from the set of graphical items within the enclosed graphical shape; and
    in response to the identified at least one graphical item, moving the identified at least one graphical item located outside the enclosed, graphical shape inside the enclosed, graphical shape.

12. The computing device of claim 11, wherein the receiving the additional user input comprises detecting a line being drawn from inside of the enclosed, graphical shape to outside of the enclosed, graphical shape.

13. The computing device of claim 11, wherein the receiving the additional user input comprises detecting a movement of a body part from inside of the enclosed, graphical shape to outside of the enclosed, graphical shape.

14. The computing device of claim 11, wherein the memory configured to store-instructions that when executed by the at least one processor, causes operations to be performed, the operations further comprising:
  in response to extracting the set of common properties associated with the set of data objects within the enclosed, graphical shape, associating the enclosed, graphical shape with the set of common properties associated with the set of data objects from the set of graphical items within the enclosed, graphical shape.

15. The computing device of claim 14, wherein the memory configured to store-instructions that when executed by the at least one processor, causes operations to be performed, the operations further comprising:
  updating the set of common properties associated with the enclosed, graphical shape by associating a new property with the enclosed, graphical shape.

16. The computing device of claim 15, wherein the operations of updating the set of common properties associated with the set of data objects from the set of graphical items associated with the enclosed, graphical shape by associating a new property with the enclosed, graphical shape further comprising:
  displaying the new property in the graphical region listing the various properties; and
  receiving a command indicating a line drawn from the new property within the graphical regions to the enclosed, graphical shape displayed on the video display.

17. The computing device of claim 11, wherein the memory configured to store-instructions that when executed by the at least one processor, causes operations to be performed, the operations further comprising:
  displaying, on the video display, the set of common properties associated with the set of data objects from the set of graphical items within the enclosed, graphical shape, in a graphical region that lists various properties.

18. A non-transitory machine-readable medium that stores instructions for sharing visual data on a video display during a collaborative session with multiple users, which, when performed by a machine, causes the machine to perform operations comprising:
  displaying graphical items on the video display, each graphical item represented by one or more data objects having at least one property stored in a database of properties accessible to the database application;
  receiving a user input defining an enclosed, graphical shape on the video display, the enclosed, graphical shape drawn around a set of graphical items from the displayed graphical items, the set of graphical items within the enclosed, graphical shape associated with a set of data objects;
  receiving additional user input to operate on the enclosed, graphical shape to initiate an extraction of a set of common properties associated with the set of data objects from the set of graphical items within the enclosed, graphical shape;
  extracting, in response to receiving the additional user input to operate on the enclosed, graphical shape, the set of common properties associated with the set of data objects from the set of graphical items within the enclosed, graphical shape by having the database application query the database of properties;
  automatically identifying at least one graphical item located outside the enclosed, graphical shape that includes the common set of properties associated with the set of data objects from the set of graphical items within the enclosed graphical shape; and
  in response to the identified at least one graphical item, moving the identified at least one graphical item located outside the enclosed, graphical shape inside the enclosed, graphical shape.

19. The non-transitory machine-readable medium of claim 18, wherein the operation of receiving the additional user input comprises detecting a line being drawn from inside of the enclosed, graphical shape to outside of the enclosed, graphical shape.

20. The non-transitory machine-readable medium of claim 18, wherein the operation of receiving the additional user input comprises detecting a movement of a body part from inside of the enclosed, graphical shape to outside of the enclosed, graphical shape.

* * * * *